(12) United States Patent
Dawson et al.

(10) Patent No.: US 8,621,464 B2
(45) Date of Patent: Dec. 31, 2013

(54) ADAPTIVE SPINNING OF COMPUTER PROGRAM THREADS ACQUIRING LOCKS ON RESOURCE OBJECTS BY SELECTIVE SAMPLING OF THE LOCKS

(75) Inventors: Michael H. Dawson, Austin, TX (US);
Vijay V. Sundaresan, Austin, TX (US);
Alexei I. Svikine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/017,848

(22) Filed: Jan. 31, 2011

(65) Prior Publication Data

US 2012/0198454 A1 Aug. 2, 2012

(51) Int. Cl.
*G06F 9/46* (2006.01)
*G06F 12/00* (2006.01)
*G06F 12/14* (2006.01)

(52) U.S. Cl.
USPC ........... 718/100; 718/101; 718/102; 718/104; 710/200

(58) Field of Classification Search
USPC .................. 718/100, 102, 101, 104; 710/200
See application file for complete search history.

(56) References Cited

U.S. PATENT DOCUMENTS

| | | | |
|---|---|---|---|
| 6,530,079 B1 | 3/2003 | Choi et al. | |
| 6,687,904 B1 | 2/2004 | Gomes et al. | |
| 7,383,368 B2 * | 6/2008 | Schopp | 710/200 |
| 2003/0114949 A1 | 6/2003 | Armstrong et al. | |
| 2005/0080963 A1 * | 4/2005 | Schopp | 710/200 |
| 2005/0081204 A1 | 4/2005 | Schopp | |
| 2006/0167921 A1 * | 7/2006 | Grebus et al. | 707/102 |
| 2007/0169002 A1 | 7/2007 | Kronlund et al. | |
| 2009/0307707 A1 | 12/2009 | Gellerich et al. | |
| 2009/0328053 A1 * | 12/2009 | Dice | 718/104 |

OTHER PUBLICATIONS

Karlin et al. "Empirical studies of competitve spinning for a shared-memory multiprocessor" SOSP '91 Proceedings of the thirteenth ACM symposium on Operating systems principles, pp. 41-55.*
*Empirical Studies of Competitive Spinning for a Shared-Memory Multiprocessor*, A. R. Karlin et al., Proceedings of the 13$^{th}$ ACM Symposium on Operating System Principles, 1991.
*Selective Optimization of Locks by Runtime Statistics and Just-in-time Compliation*, R. Odaira et al., Parallel and Distributed Symposium, 2003 Proceedings Inl., Apr. 22-26, 2003.

* cited by examiner

*Primary Examiner* — Emerson Puente
*Assistant Examiner* — Willy W Huaracha
(74) *Attorney, Agent, or Firm* — J. B. Kraft; David A. Mims

(57) ABSTRACT

In the dynamic sampling or collection of data relative to locks for which threads attempting to acquire the lock may be spinning so as to adaptively adjust the spinning of threads for a lock, an implementation for monitoring a set of parameters relative to the sampling of data of particular locks and selectively terminating the sampling when certain parameter values or conditions are met.

18 Claims, 5 Drawing Sheets

US 8,621,464 B2

ADAPTIVE SPINNING OF COMPUTER PROGRAM THREADS ACQUIRING LOCKS ON RESOURCE OBJECTS BY SELECTIVE SAMPLING OF THE LOCKS

TECHNICAL FIELD

The present invention relates to computer systems utilizing multi-threaded computer programs and particularly to the running of computer application threads effectively to share resources.

BACKGROUND OF RELATED ART

In multiprocessing computer systems, threads from multi-threaded computer application programs are run under rules or protocols that synchronize resources with threads acquiring or seeking particular resources so that only one thread may acquire or lock a resource object to the mutual exclusion of all other threads. If a thread acquires a lock on an object, that thread owns or holds the lock on the object and all other threads seeking or contending to acquire the particular object will not be allowed to access the object until the lock is released.

When a thread seeking to acquire a lock on an object that is currently locked continuously iteratively checks for the release of that lock, the condition is called spinning. When a specific thread spins instead of yielding central processing unit (CPU) time to another thread, there is a question of whether the computer resources are being used effectively. The effectiveness of time of spinning varies from resource lock to resource lock, i.e., spinning may be an effective use of CPU time with respect to one resource lock but not to another. As a result, adaptive spinning has been developed wherein data is developed by dynamically collecting, i.e. sampling data of spinning threads for specific locks while computer program applications are being run, and this collected data is used to adaptively enable/disable spinning of threads requesting selected locks so as to minimize spinning on locks for which the use of CPU time is not beneficial while maximizing spinning for which the use of CPU time is effective.

SUMMARY OF THE PRESENT INVENTION

The present invention has found that the CPU time and computer resources used in the dynamic sampling or collection of data relative to specific spinning threads acquiring selected locks so as to adaptively adjust the spinning of the threads requesting selected locks introduces overheads, that in some cases degrades the performance of computer applications using the locks. As such, it may not be the most effective use of such resources and CPU time for all locks. Accordingly, an aspect of the present invention is to monitor a set of parameters relative to the sampling of data of locks for which there may be spinning threads and selectively to enable and disable the sampling when certain parameter values or conditions are met.

Accordingly, an aspect of the invention is directed to a method for adjusting the spinning of computer process threads awaiting locks on objects in data processing systems comprising monitoring (sampling) values of a first set of parameters of a lock on an object for which threads requesting said lock are capable of spinning, and applying the monitored values of this first set of parameters to adjust the spinning of threads requesting the lock. The method further includes monitoring values of a second set of parameters, relative to the lock(which is being sampled as described above) and applying said values of the second set of parameters to determine whether the monitoring (sampling) of the first set of parameters of the lock should be terminated or restarted (disabled/enabled). The first and second sets of parameters may have a common parameter but the values of such parameters required by the respective sets may be different. Also, the second set of parameter values may initially be applied to predetermine whether a lock for which threads are spinning should be monitored (sampled).

When reference is made hereinabove to threads capable of spinning, it should be understood that the values of the parameters of the lock being monitored will be used to adjust spinning of threads that may be currently spinning for the lock or threads that may not currently be requesting the lock, and thus, not spinning, but which could spin if subsequently requesting the lock.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
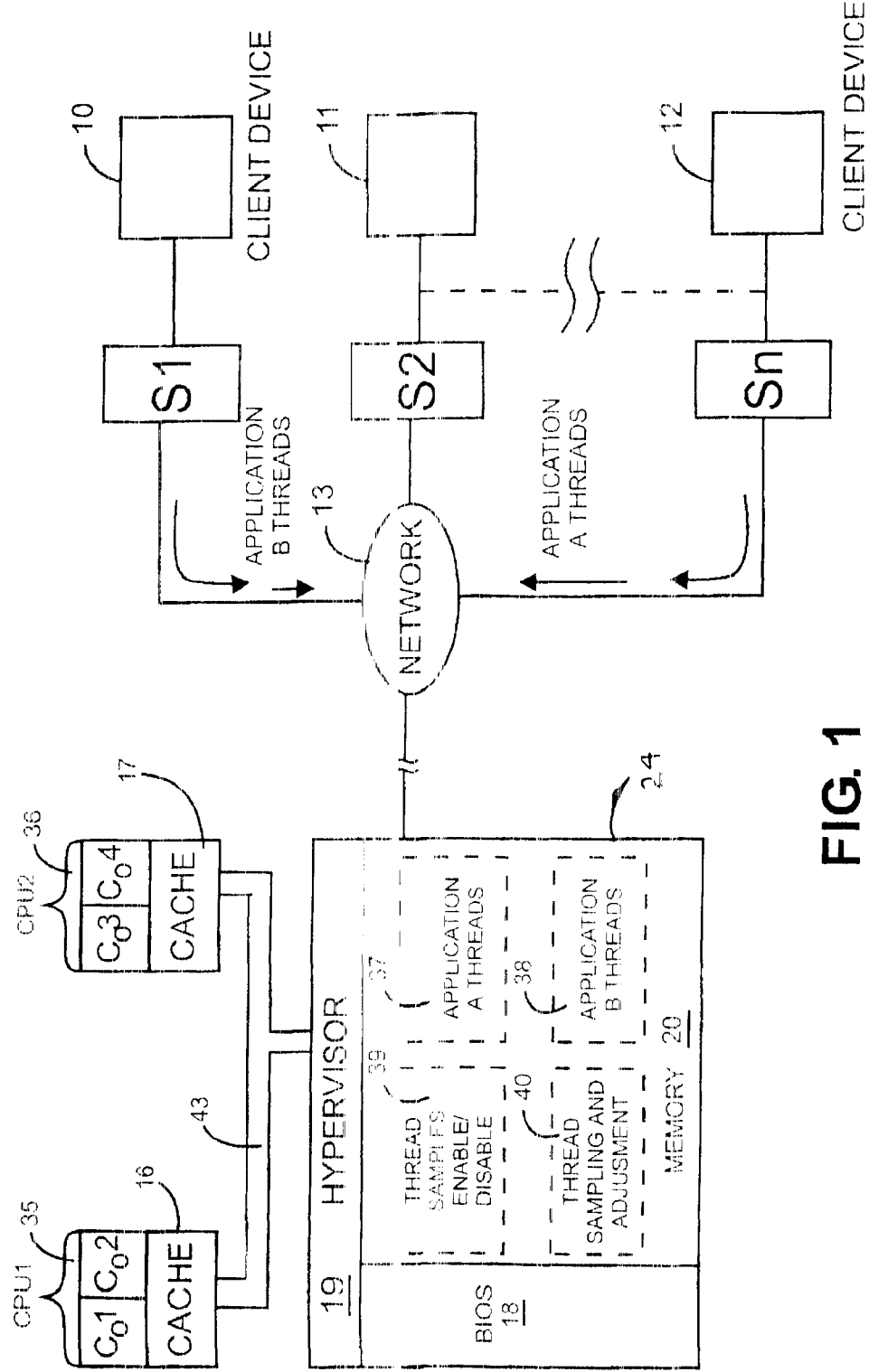
FIG. 1 is a generalized diagrammatic view of a network portion, including a pair of dual core processors and a plurality of remote user computers or client devices connected to physical cores that provide multi-threaded computer applications, the threads of which share the resources of the cores under the control of the hypervisor that may be used in the practice of the present invention.

Referring to FIG. 1, there is shown a generalized diagrammatic view of a network portion including a pair of dual core processors and a plurality of remote user computers or client devices connected to physical cores in the computer system. The CPU system shown in FIG. 1, which has been simplified for purposes of illustration, consists of a system platform supporting a pair of dual core CPUs (1 and 2) 35 and 36. Each CPU respectfully includes a set of two (2) cores Co1-Co2 and Co3-Co4; with each core set having a respective shared cache 16-17. The client devices providing the application threads to be run on the cores Co1 through Co4 may be desktop computers 10-12, respectively connected to the hybrid system 24 through respective network servers S1-Sn via a network 13 such as the Internet. All of the distribution of the application threads to cores Co1-Co4 are controlled by hypervisor 19 supported by BIOS 18 and memory 20. In this function, hypervisor 19 controls the dispatching of application threads to the CPUs 35 and 36, via bus 43. This invention may be implemented through computer programs for thread sampling and adjustment 40 and thread sampling enable/disable 39 run in hypervisor 19, which programs may be stored in memory 20. In this illustration, an Application B from client device 10 is transmitted for execution on the computer system 24 wherein it is stored 38 in memory 20. Likewise, an Application A from client device 12 is transmitted for execution on the computer system 24 wherein it is stored 37 in memory 20.

Applications A and B are multi-threaded computer application programs, the threads of which may contend for resource objects provided by cores Co1 through Co4 with each other, as well as with threads from many other applications (not shown) that may be stored in platform memory 20. All of the threads from these applications seek to acquire locks on particular resource objects provided by the cores Co1 through Co4. When a specific thread does not acquire a lock on the resource object, the thread will spin, i.e. continuously request the lock, until the thread that has the current lock on the resource object releases the lock and the spinning thread can acquire the lock.

The CPU (hypervisor 19) time spent in spinning by a specific thread can vary greatly dependent on the current lock status of the resource object in cores Co1 through Co4 sought to be acquired. Accordingly, it is understood that there are often situations when the spinning of threads trying to acquire a lock on a resource object may not be beneficial to the effective operation of the computer system, e.g. hypervisor CPU time is being wasted, and it would be more effective for the threads to stop spinning and release the CPU to other threads. Consequently, as will be described hereinafter in greater detail with respect to FIGS. 2 through 3, locks that are monitored or sampled for the values of a set of parameters determinative of whether the spinning of threads for any particular lock should be stopped or adjusted. In addition, as will hereinafter be described in greater detail with respect to FIG. 4, there may be circumstances wherein even the sampling for a particular lock, for which requesting threads, may be spinning, will result in an ineffective use of CPU time and the actual monitoring or sampling of such spinning threads should be terminated. Another set of parameters, the values of which would determine whether the sampling is most effective may be applied to this end.

Figure 2:
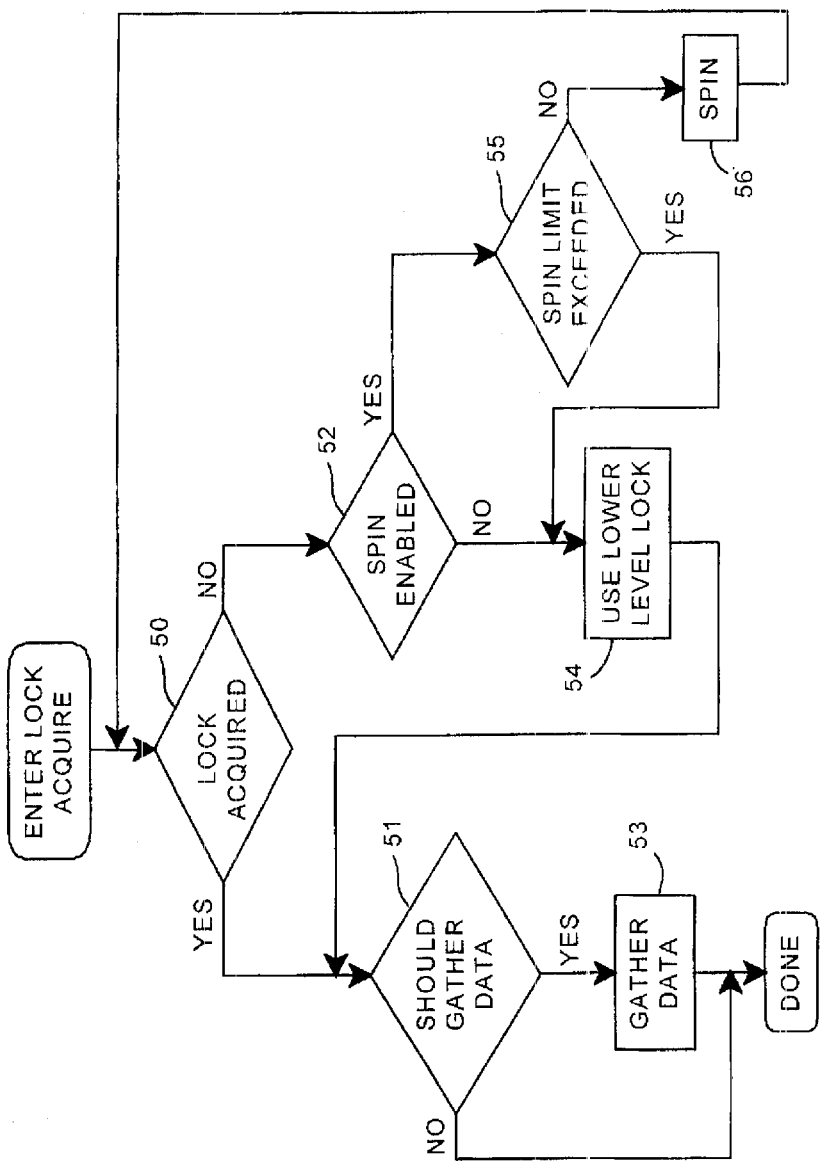
FIG. 2 is a flowchart of an illustrative program in accordance with the present invention for the initiation of the spinning of threads in the acquisition of lochs on resource objects.

Referring now to FIG. 2, a flowchart is shown of an illustrative program in accordance with the present invention for the initiation of the spinning of threads in the acquisition of locks on resource objects. When a specific thread attempts to acquire a lock on a resource, an initial determination, step 50, is made as to whether the lock has been acquired. If Yes, then a further determination is made, step 51, as to whether data should be gathered and spinning should be sampled for spinning adjustment with respect to spinning threads. The algorithms involved in such a data gathering decision will be described in greater detail with respect to FIG. 4. If the determination in step 51 is Yes, then, step 53, data is gathered (sampled). If the determination is No, then data is not gathered.

Again, with respect to decision step 50, if the decision is No (lock not acquired), a determination is made, step 52, whether, based upon spin adjust parameters resulting from data gathering (sampling), spinning is enabled for the thread trying to acquire the lock. If the determination of step 52 is Yes, the thread is permitted to spin and the spinning is monitored, step 55, to determine whether a spin limit that may be adjusted based on sampled data has been exceeded. If the determination in step 55 is No, spinning is continued, step 56, while a determination continues to be made, step 50, as to whether the requested lock has been acquired. If the determination from step 55 is Yes, the spin limit, e.g. number of spins without an acquired lock has been exceeded, then the thread is diverted to acquire a lower level lock, step 54. Likewise, if the determination in step 52, is No, spinning cannot be enabled, then the thread is diverted to acquire a lower level lock, step 54. Such a lower level lock may be an operating system (OS) lock or some other intermediate locking structure in which spinning may be used. After step 54, the process is returned to decision step 51 and continued as described hereinabove.

Figure 3:
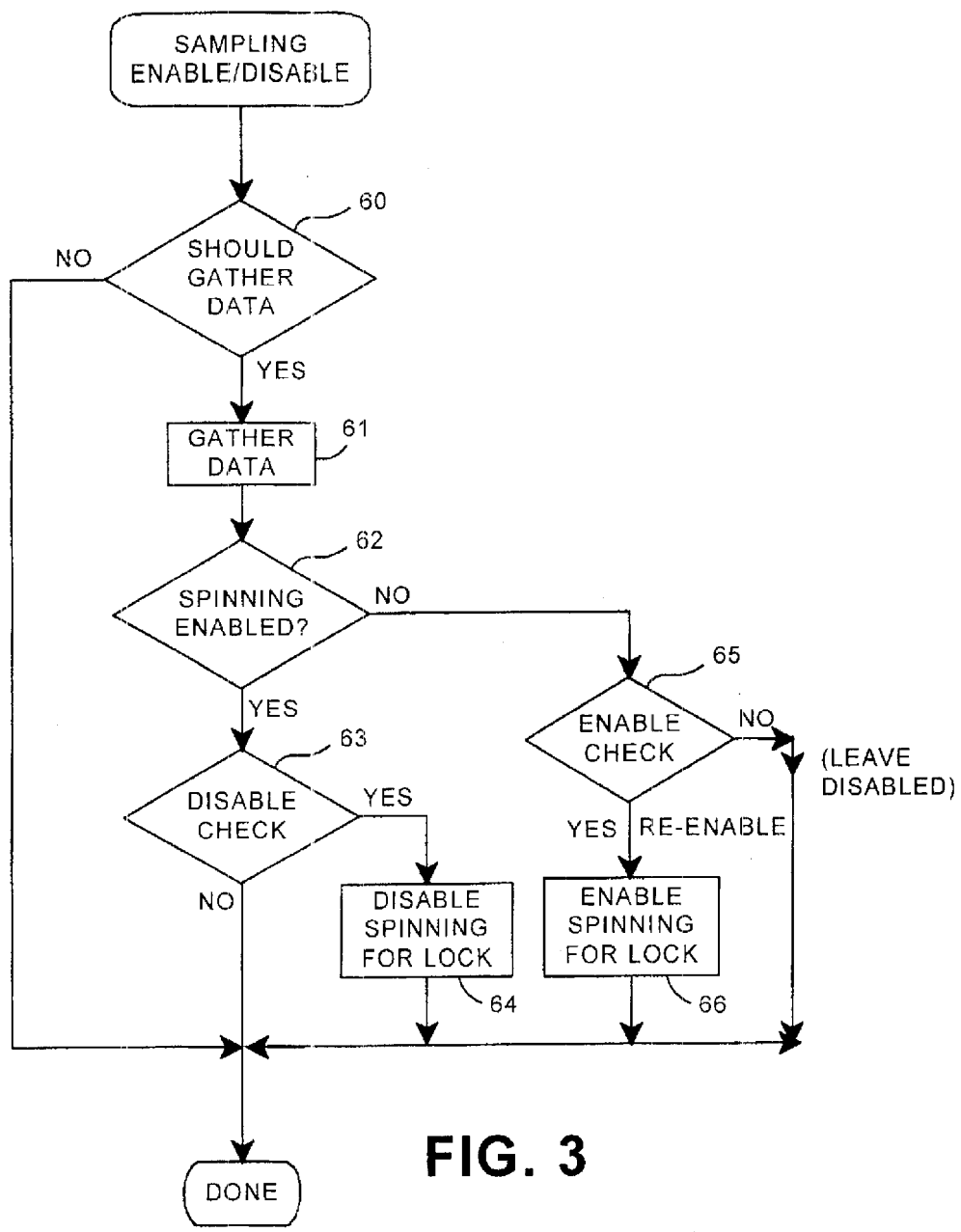
FIG. 3 is a flowchart of an illustrative program in accordance with the present invention for the sampling of spinning parameters to gather data to be used in thread spinning adjustments as a lock by a specific thread on a resource object is being released.

FIG. 3 is a flowchart of an illustrative program in accordance with the present invention for the sampling of lock parameters after a spinning thread has already acquired a particular lock. The determination being made relates to whether spinning should be enabled/disabled for subsequent threads requesting the particular lock. A determination is made, step 60, as to whether data should be gathered, i.e. spinning should be sampled for spinning adjustment with respect to spinning threads requesting, i.e. attempting to acquire the particular lock. The algorithms involved in such a data gathering decision will be described in greater detail with respect to FIG. 4. If the determination in step 60 is Yes, then, step 61, data is gathered (sampled). If the determination is No, then data is not gathered. With respect to the threads attempting to acquire the particular lock, a determination is made as to whether spinning is enabled, step 62. If Yes, spinning for the threads is carried out subject to a disable check, step 63, as to whether spinning is disabled. If the step 63 determination is No, then, spinning remains enabled and continues. If the determination in step 63 is Yes, spinning is no longer enabled, then the spinning for the acquisition of the particular lock is disabled, step 64. If at step 62 a determination is made that spinning is not enabled by threads attempting to acquire the particular lock, then further checks are dynamically made as to whether spinning by threads attempting to acquire the lock has been subsequently enabled, step 65. If No, spinning remains disabled. if Yes, then spinning is enabled or re-enabled for the specific thread, step 66.

In the flowcharts of FIGS. 2 and 3, the enabling and disabling of spinning for threads acquiring and releasing locks on shared resource objects is based upon adaptive spinning, i.e. enabling, disabling or modifying the spinning based upon data sampled or gathered from the monitoring of locks for which threads are capable of spinning.

The following examples illustrate some of the sets of parameters, the values of which may be used to determine whether the spinning of threads attempting to acquire a particular lock should be adjusted. The parameters may be based upon the attributes of the resource locks being acquired:

average hold time: if the time is greater than some determined threshold (value), then disable the spinning; or if the time is less than some determined threshold (value), then enable spinning.

slow path: record the total number of times when a lock was acquired that lower level lock was used; if the percentage of lower lock acquires is greater than a threshold (value), then disable spinning; or if the percentage of lower lock acquires is less than a threshold (value), then enable spinning. Alternatively, if the lower level lock has been acquired greater than N times (value), then disable spinning.

average lower level wait time: record the time taken for the "Use Lower Lock" step, which is the time taken to acquire a lock using lower level lock; if this time is greater than a threshold (value), then disable spinning; or if this time is less than a threshold (value), then enable spinning.

hold time relative: record hold time; if current hold time is greater than average hold time, then disable spinning or if current hold time is less than average hold time, then enable spinning.

hold time over Period: record the hold time; if the average hold time over the most recent period is a factor (value) greater than average hold time, then disable spinning; or if the average hold time over the most recent period is a factor (value) less than average hold time, then enable spinning.

Figure 4:
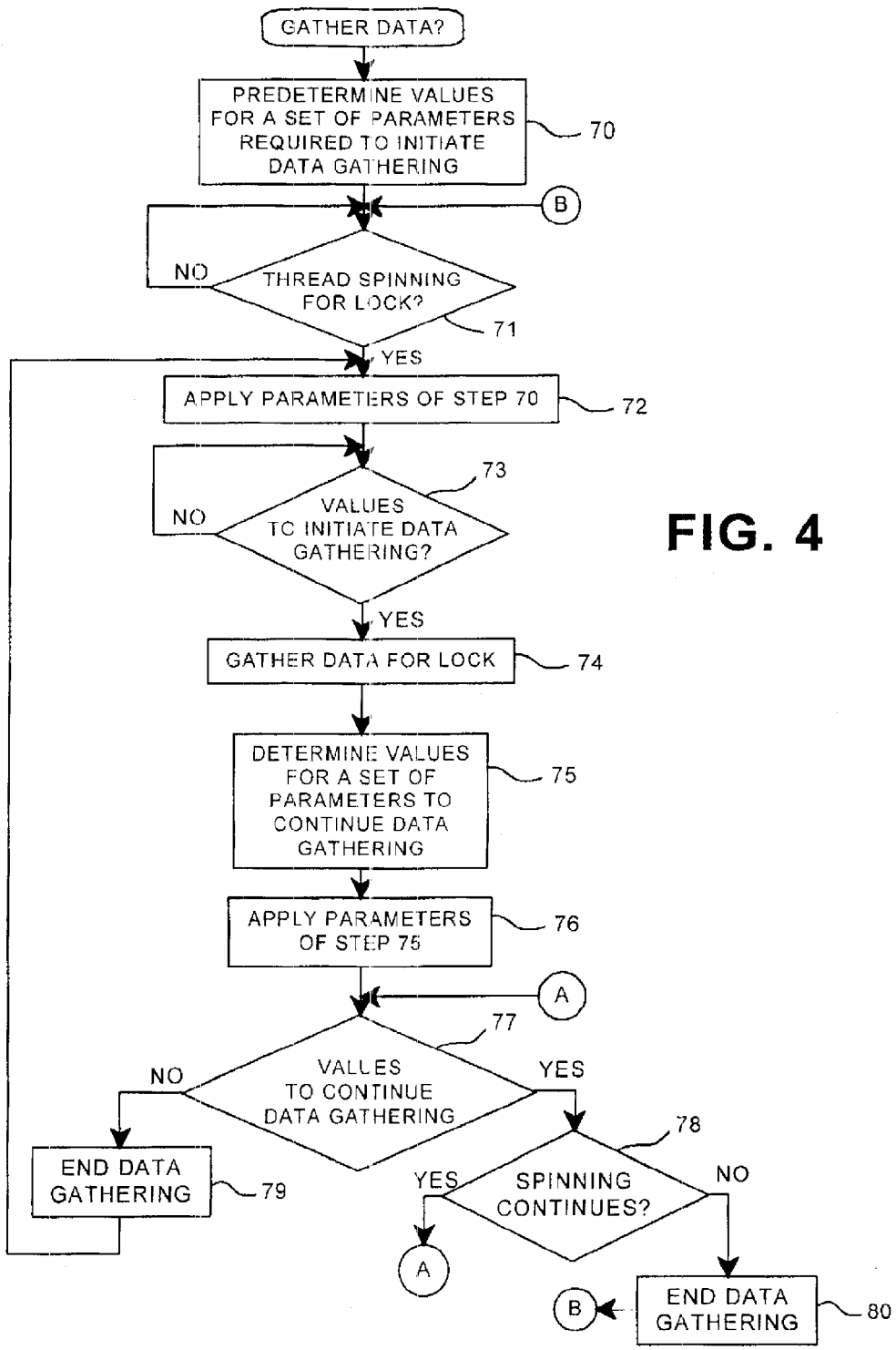
FIG. 4 is a flowchart of an illustrative program in accordance with the present invention for the monitoring of a set of parameters to determine whether the sampling of data from specific spinning threads should be selectively terminated.

In the flowchart of FIG. 4 there will be described an illustrative program in accordance with the present invention for the monitoring of a set of parameters to determine whether the sampling of data for particular locks to determine whether spinning should be enabled for threads attempting to acquire such lock should be selectively terminated. A set of parameters are determined, the values of which will be applied to determine whether data gathering, which will be referred to as sampling, should be initiated for a lock for which threads attempting to acquire the lock are spinning, step 70, FIG. 4. Examples of such parameters and sets of such parameters will hereinafter be described. Thus, when thread is spinning for the lock, Yes, step 71, the set of parameters of step 70 are applied, step 72, and a determination is made, step 73, as to whether the values of the applied parameters indicate that the data should be gathered, sampled, for the lock. If Yes, the data gathering described hereinabove with respect to FIGS. 2 through 3 is carried out, step 74. If No, the values of the applied parameters do not indicate that the lock should be sampled, the set of parameters may still be continued to be iteratively applied to determine if sampling may be commenced at a subsequent time. A set of parameters are determined, the values of which will be applied to determine whether data gathering which that be continued for each lock with potential spinning threads for which data gathering is being carried out, step 75. This set of parameters, which may be the same or vary to some extent from the set of parameters initially applied in step 70, are applied, step 76, and a determination is made, step 77, as to whether the values of the applied parameters indicate that the data gathering should be continued for the lock. If Yes, the data gathering is continued until a determination is made step 78, No, that the spinning is not continued for thread, e.g. when the thread acquires a lock. At this point, the data gathering is ended, step 80, and the monitoring process is returned to step 71 via branch B and the next spinning for a lock is awaited. If the determination in step 78 is Yes, spinning of threads for the lock continues, then the process is returned via branch A to step 77. If a determination is made in step 77, No, that the applied parameters indicate that data gathering should not be continued, the data gathering is ended, step 79, and the process is returned to step 72.

The set of parameters, the values of which may be used to determine whether there should be sampling of locks, for which threads may be spinning to gather data to be used for adaptive spinning may be varied dependent upon the characteristics of the shared resources for which the spinning threads are acquiring locks, as well as characteristics of the applications providing threads. One example of such a parameter has already been illustrated with respect to FIG. 2: the parameter would be has the thread awaiting the lock had to use a lower level lock and the value would be at least once. Another parameter would be locks that are always acquired through spinning, would not be sampled for data. This class of lock would include resource locks that have short resource lock hold times, as well as locks for which there is less contention.

Another parameter would involve periodic sampling, i.e. sample 1 out of N spinning threads for acquires, wherein N, the value may be periodically adjusted based upon the data already gathered through sampling. A further parameter and value may be disabling the data gathering on a sampled lock after a defined number (value) of samples have been taken. A parameter and value may be disabling sampling based upon a threshold value of how quickly the lock is acquired by the spinning thread.

Still other parameters and values for enabling/disabling sampling for spinning thread data include:

enabling based upon the amount of time elapsed (value) since the last sampling of a spinning thread;

enabling based upon the number (value) of garbage collections that have occurred since the last sample was taken.

Figure 5:
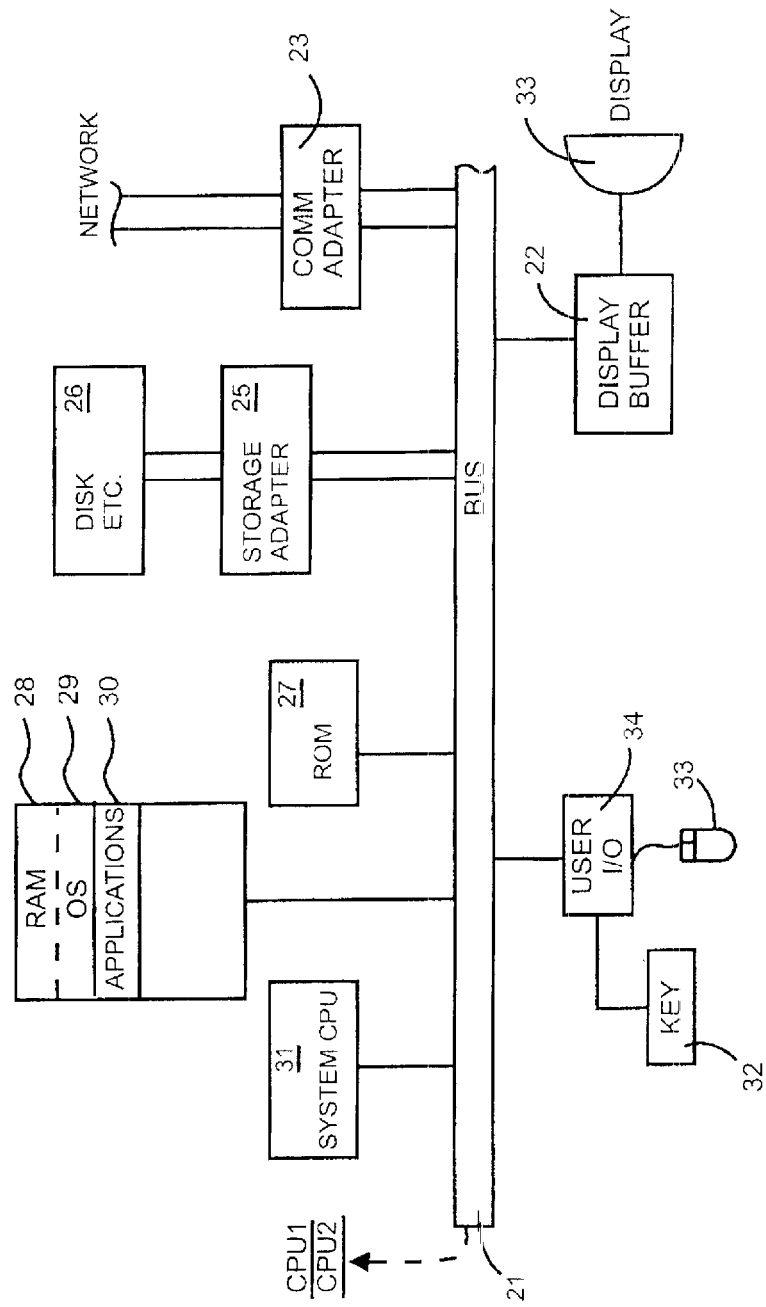
FIG. 5 is an illustrative diagrammatic view of a control processor that may be used for the hypervisor of FIG. 1.

With respect to FIG. 5, there is shown an illustrative diagrammatic view of a control processor that may be used for the hypervisor 19 of FIG. 1. A CPU 31, such as one of the microprocessors, e.g. from System p series available from International Business Machines Corporation (IBM), is provided and interconnected to various other components by system bus 21. An OS 29 runs on CPU 31, provides control and is used to coordinate the function of the various components of FIG. 2. Operating system 29 may be one of the commercially available operating systems. Application programs 30, controlled by the system, are moved into and out of the main memory Random Access Memory (RAM) 28. These programming applications may be used to implement functions of the present invention. ROM 27 includes the Basic Input/Output System (BIOS) that controls the basic computer functions of the hypervisor. RAM 28, storage adapter 25 and communications adapter 23 are also interconnected to system bus 21. Storage adapter 25 communicates with the disk storage device 26. Communications adapter 23 interconnects bus 21 with an outside Web or like network. I/O devices are also connected to system bus 21 via user interface adapter 34. Optionally, keyboard 32 and mouse 33 may be connected to bus 21 through user interface adapter 34. Where a display is used, display buffer 22 supports display 33.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for adjusting the spinning of computer process threads awaiting locks on objects in data processing systems comprising:
    monitoring values of a first set of parameters of a lock on an object, for which lock, threads requesting said lock are spinning;
    applying said monitored values of said first set of parameters to adjust the spinning of said threads requesting said lock;
    monitoring values of a second set of parameters relative to said lock on an object, for which lock, threads requesting said lock are spinning;
    applying said values of said second set of parameters to determine whether the monitoring of said first set of parameters of said lock should be terminated; and terminating the monitoring of said values of said first set of parameters of said lock while threads currently spinning continue spinning.

2. The method of claim 1, wherein said first and second sets of parameters have at least one common parameter.

3. The method of claim 1, wherein:
    said monitoring of said values of said first set of parameters monitors said first set of each at a plurality of locks on objects; and
    the monitoring of the values of said first set of parameters of at least one lock is terminated.

4. The method of claim 3, wherein:
    said second set of parameters is predetermined; and
    and said values of said second set of parameters is initially applied to predetermine whether each of said plurality of locks should be monitored.

5. The method of claim 4, wherein one of said second set of parameters is whether said lock has had to use a lower level lock than an initially requested lock at least once.

6. The method of claim 3, wherein one of said second set of parameter values is to hold time for a spinning thread for acquiring the requester lock.

7. A system for adjusting the spinning of computer process threads awaiting locks on objects in data processing, said system comprising:
   a processor; and
   a computer memory holding computer program instructions which when executed by the processor perform the method comprising:
   monitoring values of a first set of parameters of a lock on an object, for which lock, threads requesting said lock are spinning;
   applying said monitored values of said first set of parameters to adjust the spinning of said threads requesting said lock;
   monitoring values of a second set of parameters relative to said lock on an object, for which lock, threads requesting said lock are spinning;
   applying said values of said second set of parameters to determine whether the monitoring of said first set of parameters of said lock should be terminated; and terminating the monitoring of said values of said first set of parameters of said lock while threads currently spinning continue spinning.

8. The system of claim 7, wherein said first and second sets of parameters have at least one common parameter.

9. The system of claim 7, wherein:
   said monitoring of said values of said first set of parameters monitors said first set of each of a plurality of locks on objects; and
   the monitoring of the values of said first set of parameters of at least one lock is terminated.

10. The system of claim 9, wherein:
   said second set of parameters is predetermined; and
   and said values of said second set of parameters is initially applied to predetermine whether each of said plurality of locks should be monitored.

11. The system of claim 10, wherein one of said second set of parameters is whether said lock has had to use a lower level lock than an initially requested lock at least once.

12. The system of claim 9, wherein one of said second set of parameter values is the hold time for a spinning thread for acquiring the requested lock.

13. A computer usable nod-transitory storage medium having stored thereon a computer readable program for adjusting the spinning of computer process threads awaiting locks on objects in a data processing system, wherein the computer readable program when executed on a computer causes the computer to:
   monitor values of a first set of parameters of a lock on an object, for which lock, threads requesting said lock are spinning;
   apply said monitored values of said first set of parameters to adjust the spinning of said threads requesting said lock;
   monitor values of a second set of parameters relative to said lock on an object, for which lock, threads requesting said lock are spinning;
   apply said values of said second set of parameters to determine whether the monitoring of said first set of parameters of said lock should be terminated; and terminate the monitoring of said values of said first set of first parameters of said lock while threads currently spinning continue spinning.

14. The computer usable non-transitory storage medium of claim 13, wherein said first and second sets of parameters have at least one common parameter.

15. The computer usable non-transitory storage medium of claim 13, wherein said computer readable program when executed on a computer:
   monitors said values of said first set of parameters by monitoring said first set parameter values of each of a plurality of locks on objects; and
   the monitoring of the values of said first set of parameters of at least one lock is terminated.

16. The computer usable non-transitory storage medium of claim 15, wherein:
   said second set of parameters is predetermined; and
   and said values of said second set of parameters is initially applied to predetermine whether each of said plurality of locks should he monitored.

17. The computer usable non-transitory storage medium of claim 16, wherein one of said second set of parameters is whether said lock has had to use a lower level lock than an initially requested lock at least once.

18. The computer usable non-transitory storage medium of claim 16, wherein ore of said second set of parameter values is the hold time for a spinning thread acquiring the requested lock.

\* \* \* \* \*